(12) United States Patent
Tanna et al.

(10) Patent No.: US 12,198,084 B2
(45) Date of Patent: Jan. 14, 2025

(54) INFERENTIAL ANALYSIS AND REPORTING OF CONTEXTUAL COMPLAINTS DATA

(71) Applicant: SAP SE, Walldorf (DE)

(72) Inventors: Jemin Tanna, Bangalore (IN); Sneha Patil, Pune (IN); Ajesh Kumar, Trivandrum (IN); Manu Maheshwar Puthiyadath, Thrissur (IN); Venkata Sai Abhishek Chavali, Mumbai (IN)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 17/038,394

(22) Filed: Sep. 30, 2020

(65) Prior Publication Data

US 2022/0101232 A1 Mar. 31, 2022

(51) Int. Cl.
| | |
|---|---|
| G06F 9/54 | (2006.01) |
| G06F 16/906 | (2019.01) |
| G06F 40/295 | (2020.01) |
| G06N 3/08 | (2023.01) |
| G06N 3/082 | (2023.01) |
| G06N 5/045 | (2023.01) |
| G06Q 10/0631 | (2023.01) |
| G06Q 40/04 | (2012.01) |

(52) U.S. Cl.
CPC ..... *G06Q 10/06315* (2013.01); *G06F 40/295* (2020.01); *G06N 3/082* (2013.01); *G06N 5/045* (2013.01); *G06Q 10/06312* (2013.01)

(58) Field of Classification Search
CPC ........ G06Q 10/06315; G06Q 10/06312; G06F 40/295; G06N 3/082; G06N 5/045
USPC .......................................................... 706/39
See application file for complete search history.

(56) References Cited

U.S. PATENT DOCUMENTS 9,704,097 B2 7/2017 Devarajan et al.
10,789,526 B2 * 9/2020 Wilson ................. H04L 67/568
(Continued)

FOREIGN PATENT DOCUMENTS

DE 102010012847 B4 4/2015
JP 2019521427 A 7/2019

OTHER PUBLICATIONS

Hu et al. "Review of Sentiment Analysis Based on Deep Learning", 2015 IEEE 12th International Conference on e-Business Engineering (Year: 2015).*

(Continued)

*Primary Examiner* — Brandon S Cole
(74) *Attorney, Agent, or Firm* — Buckley, Maschoff & Talwalkar LLC

(57) ABSTRACT

In a process of inferential analysis and reporting of contextual complaints data, a social media message is processed to formulate an input data for a neural network, The input data is processed to chunk and identify one or more entities of interest to an enterprise, wherein the enterprise includes one or more line of business (LOB). The identified entities of interest are processed by a plurality of neural nodes in the neural network to identify a specific set of LOB(s) that are impacted by the social media message. With the entities of interest as input to the neural network, corresponding to a plurality of parameters associated with an enterprise, output from the individual neural nodes is dynamically determined. The output from the plurality of neural nodes is collated to generate a report with action items specific to the set of LOB(s) to take pre-emptive actions in the enterprise.

20 Claims, 13 Drawing Sheets

(56) References Cited

U.S. PATENT DOCUMENTS

| | | | |
|---|---|---|---|
| 11,470,171 B2* | 10/2022 | Rogynskyy | G06F 16/182 |
| 2011/0264519 A1 | 10/2011 | Chan et al. | |
| 2019/0372826 A1* | 12/2019 | Sherr | H04L 41/046 |
| 2020/0026798 A1* | 1/2020 | Roy | G06F 9/54 |

OTHER PUBLICATIONS

Balakrishanan et al., "A Neural Network Framework for Predicting Dynamic Variations in Heterogeneous Social Networks," PLoS ONE 15(4): e0231842. https://doi.org/10.1371/journal.pone.0231842, Apr. 27, 2020, 13 pages total.

Dang et al, "Sentiment Analysis Based on Deep Learning: A Comparative Study," Electronics, 9 (3), 483, 2020, 29 pages total.

Hayat et al., "Towards Deep Learning Prospects: Insights for Social Media Analytics," Apr. 3, 2019, Computer Science, IEEE Access, https://ieeexplore.ieee.org/stamp/stamp.jsp?arnumber-8673951, 22 pages total.

Khedkar et al., Abstract for "Ensemble Classifier for Praise or Complaint Classification and Visualization from Big Data," Internet of Things, Smart Computing and Technology: A Roadmap Ahead pp. 97-118, downloaded on Sep. 24, 2020 from https://link.springer.com/chapter/10.1007/978-3-030-39047-1_5.

Liu et al., Abstract for "Feature Generation by Convolutional Neural Network for Click-Through Rate Prediction," WWW '19, The World Wide Web Conferefence, San Francisco, CA, May 2019, pp. 1119-1129, downloaded from https://arxiv.org/pdf/1904.04447.pdf, 11 pages total.

Majumder et al., Abstract for "Multimodal Sentiment Analysis Using Hierarchical Fusion with Context Modeling," Knowledge-Based Systems vol. 161, Dec. 1, 2018, pp. 124-133, downloaded on Sep. 24, 2020 from https://arxiv.org/abs/1806.06228.

O'Driscoll, "Real-Time, Targeted, Out-Of-Home Advertising with Dynamic Pricing," Dissertation for Trinity College School of Computer Science and Statistics, Dublin, May 3, 2019, 69 pages total.

Saif, "Semantic Sentiment Analysis of Microblogs," PhD Thesis, Knowledge Media Institute Open University, Jan. 21, 2015, 225 pages total. Downloaded from http://swsa.semanticweb.org/sites/default/files/201607/hassan_saif_thesis_0.pdf.

SAS® Visual Text Analytics 8.4: User's Guide, SAS® Documentation, May 21, 2020, SAS Institute Inc., SAS Campus Drive, Cary, NC 27513-2414, 172 pages total. Downloaded from http://documentation.sas.com/api/docsets/ctxtug/8.4/content/ctxtug.pdf?locale=en.

Wang et al., Abstract for "Topic Sentiment Analysis in Twitter: A Graph-Based Hashtag Sentiment Classification Approach," CIKM '11: Proceedings of the 20th ACM international conference on Information and knowledge management • Oct. 2011 • pp. 1031-1040 • https://doi.org/10.1145/2063576.2063726, downloaded on Sep. 24, 2020 from: https://dl.acm.org/doi/10.1145/2063576.2063726.

Zhang et al., "Deep Learning for Sentiment Analysis: A Survey," arXiv:1801.07883v2 , Jan. 2018, 34 pages total. Downloaded on Sep. 24, 2020 from: https://arxiv.org/ftp/arxiv/papers/1801/1801.07883.pdf.

* cited by examiner

Complaints 510

Simon: The winter tyres are not holding on good. I have used it for 200kms. I had to replace 2 tyres with my own cost within 2 months of purchase. This will be my first and last car ever to be purchased of this brand. Heidelberg . Jul 17 2019

Schimdt: Please note that one Tyre of our X has burst while on road, for the reason unknown to us. The vehicle has just covered 29000 km till date and the other tyres are also showing a sign of baldness. The details of burst tyre have the following nos on it

Research & Development 504 ∨    Topics ∨    506

508

Tyre – Testing

Test the model AVB 100 in road conditions like Heidelberg in December i.e., during the winter.
<Not Assigned> . 3 days + Project 512

Research & Development

Tyre lifetime bench-marking: Range of testing 200-300 km Of type XUC 210 with average additional...
<Not Assigned> . 2 months + Project

FIG. 5B

INFERENTIAL ANALYSIS AND REPORTING OF CONTEXTUAL COMPLAINTS DATA

BACKGROUND

Social media provides a plethora of information in various formats and from varied domains. Social media not just provides historical data but real-time information. Social media data is likely the best representation of an end-user or consumer because it provides the granular detail and genuine feedback from an end-user regarding any product, service, solutions, etc. It is challenging for an enterprise to collect, analyze and use such social media data due to its nature of enormous volume and identifying pertinent messages by sifting through such voluminous data. In some scenarios, specific social media data does not reach a corresponding division or department within the enterprise. Further, the enterprise also faces a challenge in receiving such social media data in a format that translates to insights to be used by the enterprise in real-time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIGS. 5A, 5B, and FIG. 5C in combination illustrates a sample report with action items, according to one embodiment.

DETAILED DESCRIPTION

Embodiments of techniques of inferential analysis and reporting of contextual data are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Consider a scenario where a user or a consumer is driving a car on a highway and the car breaks down midway. When the consumer experiences delay in getting the car fixed, for example, it could be a specific part/component in the car that was damaged, and there is a delay in getting that part fixed, the consumer typically opts for logging a complaint on any of the social media website that the consumer is familiar with. It is possible that more than one consumer is facing the same issue and the manufacturers of the car may not be aware of the same. These complaints posted on the social media has to reach the corresponding department within the car manufacturing enterprise for them to address the complaint. The specific part/component in the car becomes an entity of interest to the enterprise. Addressing such complaints may be handled in a direct mode and/or an indirect mode. When the complaints are addressed by a specific department directly responsible for addressing the complaint, it is referred to as the direct mode. Whereas, when the complaints are required to be addressed by a specific set of department(s) indirectly responsible for addressing the complaint, it is referred to as the indirect mode. For example, the indirect mode may include strategic inputs to various departments such as research and development department, marketing campaign and offers department, etc. In one embodiment, various complaints posted on social media platforms are to be collected, assimilated, processed and analyzed to derive useful insights and shared with the specific department as action items.

Figure 1:
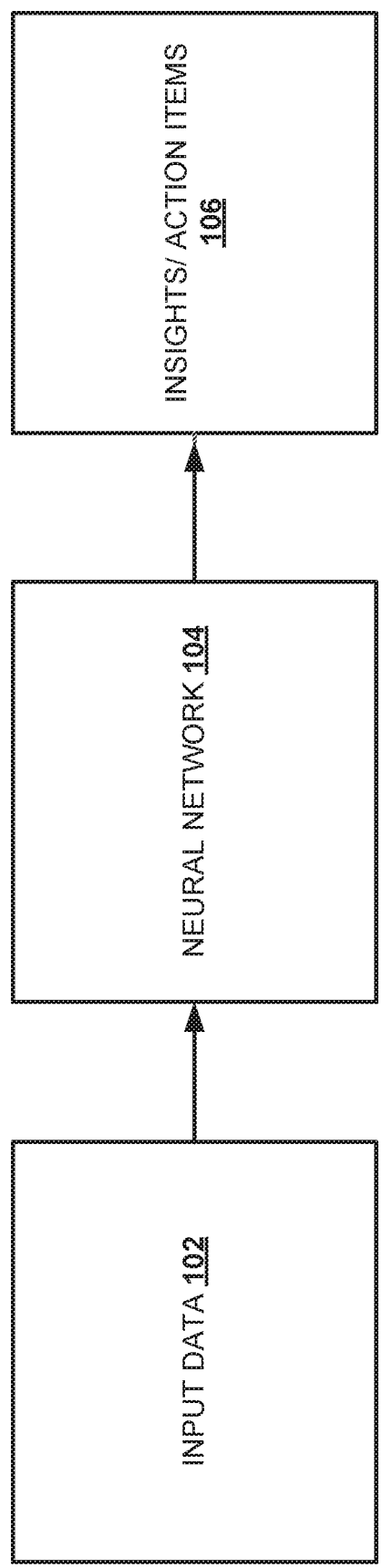
FIG. 1 is a block diagram illustrating high level flow diagram for inferential analysis and reporting of contextual complaints data, according to one embodiment.

FIG. 1 is a block diagram illustrating high level flow diagram for inferential analysis and reporting of contextual data, according to one embodiment. Input data 102 may be received from any social media platform/website. The input data 102 may be in the form of a complaint, comment, statement, message, news, status, video, audio, feedback, blog, article, etc. Further, the input data 102 may be embedded within the message, news, status, video, audio, feedback, blog, article, etc. The input data 102 is provided as input to a neural network 104. The neural network 104 provides a method of computing based on the interaction between multiple connected processing elements called nodes. Initially, the nodes in the neural network 104 are connected based on the initial estimate of the association between other nodes in the neural network 104. The neural network 104 adapts to the changing inputs, so that the neural network 104 generates the best possible output without redesigning the output criteria. The neural network 104 is trained so that the relationship between the nodes shall generate, re-generate and de-generate dynamically, through the various functions defined in the subsequent sections below to improve the accuracy of the output.

During the training process, weights associated with the individual nodes dynamically change based on the learnings of the neural nodes. The continuous learning and training of the neural nodes help discover the novel connections between the neural nodes and improve the overall score associated with the neural nodes. The technique used to train the neural nodes where the final error/output is propagated as input to the neural network 104 in a way that allows effective modification of weights of nodes that are not directly connected to the output node. This technique may be used to train weights of arbitrary number of neural nodes in the neural network. As a result of processing by the neural network 104, a report in the form of insights and/or action items 106 are generated. The insights and/or action items 106 include action items to address the complaints or feedback received from the social media website as input data 102. During the training process, the weight of the nodes dynamically changes and coalesce to a state where the neural network 104 results in an optimal solution.

Figure 2:
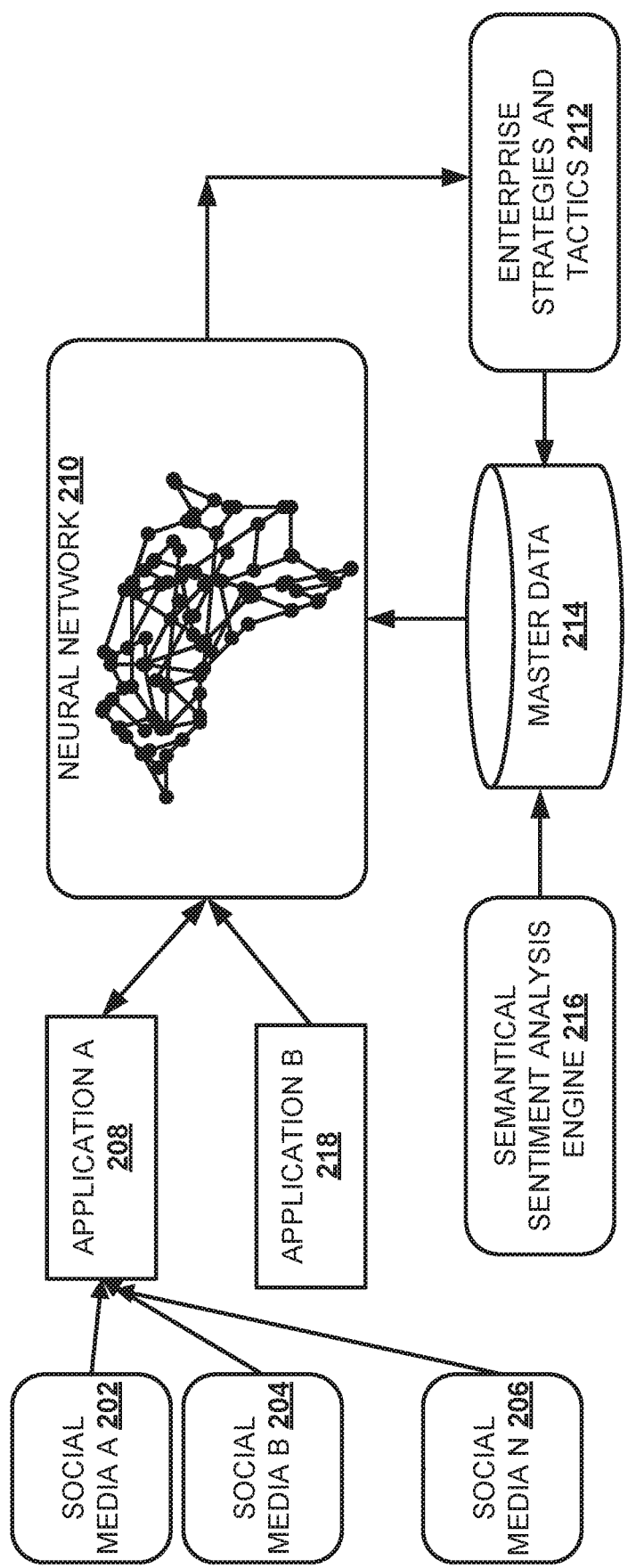
FIG. 2 is a block diagram illustrating an architecture for inferential analysis and reporting of contextual complaints data, according to one embodiment.

FIG. 2 is a block diagram illustrating an architecture for inferential analysis and reporting of contextual complaints data, according to one embodiment. Various social media applications or platforms such as 'social media A' 202, 'social media B' 204 up to 'social media N' 206 feed the input data to the 'application A' 208. The input data may be in the form of a complaint, comment, statement, message, news, status, video, audio, feedback, blog, article, etc. Here, the 'application A' 208 is an enterprise complaint system capable of assimilating input data from social pages of the enterprise, other social feeds, etc. In one embodiment, the social media platforms may be able to feed the input data to the neural network 210 directly. Enterprise strategies and tactics 212 provides the strategies of the enterprise to the neural network 210 via master data 214. Enterprise strategies and tactics associated with the enterprise may be referred to as parameters. For example, the goals, strategies projected, business focus, road map of the enterprise, etc., are fed into the master data 214. These strategies and tactics of the enterprise may evolve and change over a period of time as the neural network 210 evolves with the number of input messages it receives. For example, the score or rank of a specific strategy may change based on the interaction of the input message with the neural network 210.

Semantical sentiment analysis engine 216 works on the master data 214. Semantical sentiment analysis engine 216 runs semantic sentiment analysis on the strategies and tactics information received from the enterprise strategies and tactics 212 on the master data 214 before feeding into the neural network 210. For example, based on the sentiment analysis, a strategy like 'sustainability' has higher priority or higher rank over a strategy like 'migration to cloud platform'. Master data 214 acts as a primary start point that feeds strategy and tactics with semantical and sentimental derivations to the neural network 210. The master data 214 receives strategy related information from enterprise strategies and tactics 212 and lets sentimental analysis be performed on that data by semantical sentiment analysis engine 216. The processed data at the master data 214 is fed as input to the neural network 210. The neural network 210 may include multiple neural nodes. The neural nodes occupy an arbitrary position in space, and the edges represent a relationship between the neural nodes connected amongst themselves. The individual nodes in the graph neural network are also referred to as evolving neural nodes. The individual neural nodes perform a set of functions and provides the desired output. The neural network 210 takes input message and processes it to generate a snapshot with action items.

'Application B' 218 accesses the neural network 210 to get snapshot and generate the report with insights. The 'application B' 218 reads the final output from the neural network 210 and renders it to the corresponding enterprise user.

Figure 3A:
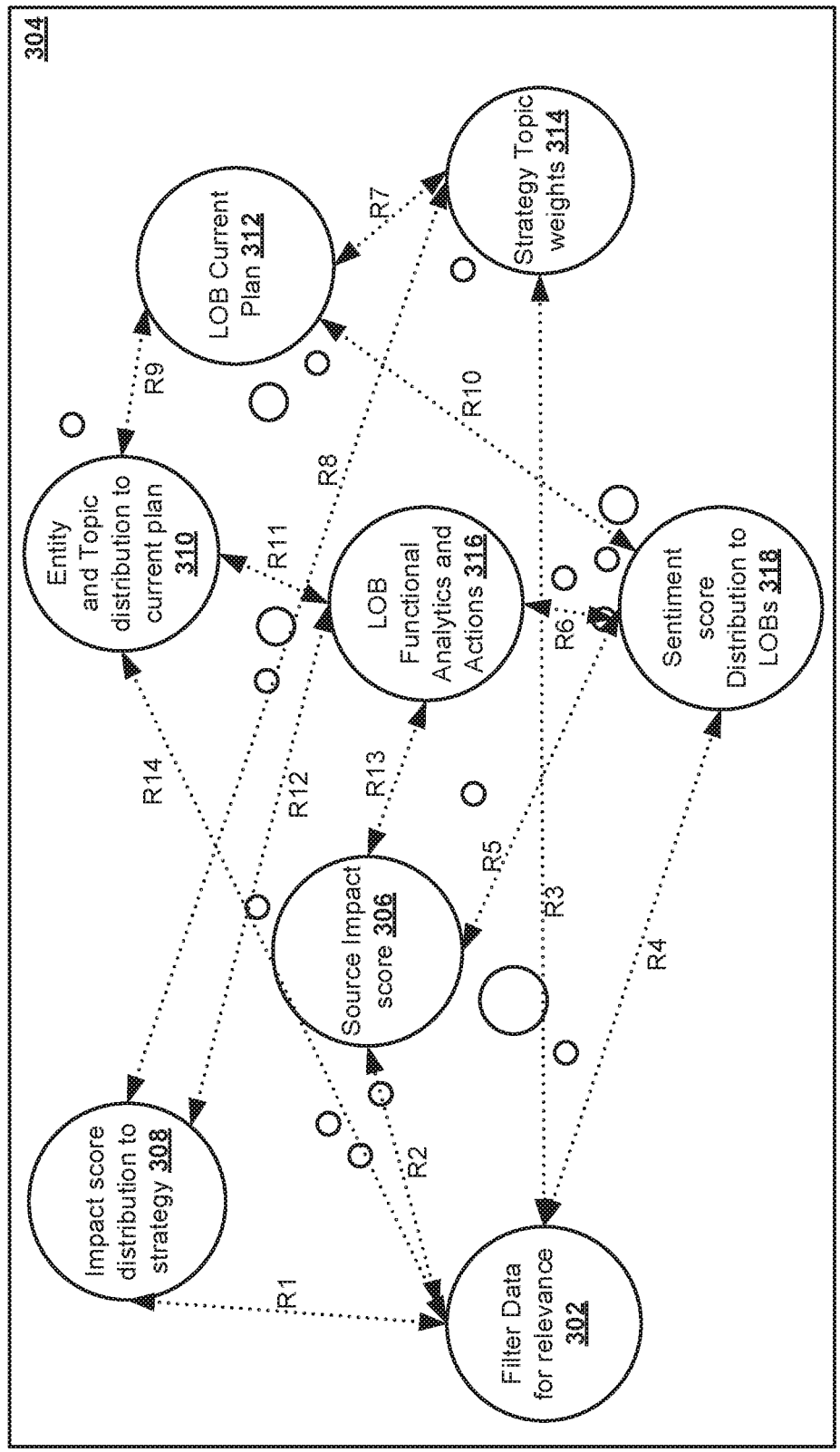
FIG. 3A is an exemplary graph neural network representing an initial set of neural nodes and an initial set of relationship between the initial set of neural nodes, according to one embodiment.

FIG. 3A is an exemplary graph neural network representing an initial set of neural nodes and an initial set of relationship between the initial set of neural nodes, according to one embodiment. The graph neural network includes a graph data structure comprising of neural nodes and edges connecting the neural nodes. The neural nodes occupy an arbitrary position in space, and the edges represent a relationship between the neural nodes. Here, the relationship between the neural nodes could be mutual or one-sided. For example, if the neural nodes represent users, the edge connecting the neural nodes represent the relationship between the users. The individual neural node may be associated with a certain weight and the weights are dynamically adjusted as the neural network continues to learn from the dataset received. The individual neural nodes in the graph neural network are also referred to as evolving neural nodes represented by circular neural node for example, 'filter data for relevance' 302. The individual neural node performs an end to end task and is implemented as a neural network. These individual neural nodes are connected to each other to form a larger neural network 304. Depending on the training of the larger neural network 304, the connection between the neural nodes are generated, regenerated and degenerated.

For example, consider a neural network 304, with individual neural nodes or initial set of neural nodes such as 'filter data for relevance' 302, 'source impact score' 306, 'impact score distribution to strategy' 308, 'entity and topic distribution to current plan' 310, 'LOB current plan' 312, 'strategy topic weights' 314, 'LOB functional analytics and actions' 316, and 'sentiment score distribution to LOB' 318. Here, LOB represents 'Line of Business' which is a general term used to refer to a product or a set of related products that serve a particular customer transaction or business need. "Line of business" (LOB) typically refers to an internal corporate/enterprise business unit. LOB may also include other forms of internal structing of the enterprise such as divisions, departments, organizational units, teams, groups, sub-divisions, sub-units, etc. These individual neural nodes in the neural network 304 are generated based on the use case or business need of the Enterprise. The connection between the individual neural nodes in the neural network 304 is established based on the training data received by the neural network 304.

Various functions are involved in the generation, regeneration and degeneration of the neural nodes. The initial set of neural nodes and the relationship between these neural nodes are established. Based on the way the neural network evolves, neural nodes and the relationships between the neural nodes dynamically change. Neural nodes either move to a dormant state from an active state or move from the dormant state to the active state depending on the training of the neural network 304. Inferential function $F_{new\ node}$ determines whether a new node and relationship to the new node is required. $F_{new\ node}$ determines whether the dormant nodes need activation or active nodes require deactivation and set the relationship accordingly. Inferential function or inferential scoring function $F_{score}$ is used to determine scores of relevance between the entities. The $F_{score}$ inferential function is available in various neural nodes such as 'impact score distribution to strategy' 308, 'source impact score'

306, 'sentiment score distribution to LOBs' 318, 'filter data for relevance' 302 and 'entity and topic distribution to current plan' 310.

Initial relationships between the neural nodes in the neural network 304 are set based on the general understanding of the impact or influence entities have on each other. For example, the data extracted from an input such as complaint by 'filter data for relevance' 302 is used for deciding the 'impact score distribution to strategy' 308. Hence, a relationship 'R1' is established between the nodes 'filter data for relevance' 302 and 'impact score distribution to strategy' 308. 'Source impact score' 306 is decided based on the influence of the complainant or source of complaint. The data about the complainant is obtained as input along with the complaint from the 'filter data for relevance' node 302 and hence relation 'R2' is established between the 'filter data for relevance' node 302 and the 'source impact score' node 306. 'Filter data for relevance' node 302 provides relevant strategy topics that might be affected by the complaint. Hence relation 'R3' is established between the 'filter data for relevance' node 302 and 'strategy topic weights' 314. The data from 'filter data for relevance' 302 will help calculate the 'sentiment score distribution to the LOBs' 318. Hence the relationship 'R4' was established between 'filter data for relevance' 302 and the 'sentiment score distribution to the LOBs 318.

Since the source of the complaint affects the sentiment of the complaint, relationship 'R5' is established between the nodes 'source impact score' 306 and 'sentiment score distribution to LOB' 318. Sentiment score distribution to the LOBs affects the final output of the neural network 304. The neural node 'LOB functional analytics and actions' 316 is responsible for assimilating inputs from various neural nodes in the neural network 304 and to generate a snapshot of data to enable generation of a report. Therefore, relationship 'R6' is established between 'sentiment score distribution to LOB' 318 and 'LOB functional analytics and actions' 316. Strategy topics influences the current LOB plans, therefore, relationship 'R7' is established between the nodes 'strategy topic weights' 314 and 'LOB current plan' 312. The strategy topics affected by the complaint are used in the neural node 'impact score distribution to strategy' 308 to calculate the score. Relationship 'R8' represents the transfer of data from 'strategy topic weights' 314 node to the 'impact score distribution to strategy' 308 node where the impact score is calculated. The LOB plans affected by the complaint are used in node 'entity and topic distribution to current plan' 310. Hence, relationship 'R9' is established between the nodes 'entity and topic distribution to current plan' 310 and 'LOB current plan' 312.

The complaint data and the LOB current plans are used for calculating the sentiment score distribution to the different LOBs. Hence, relationship 'R10' is established between the nodes 'LOB current plan' 312 and 'sentiment score distribution to LOB' 318. The neural nodes contributing to the final output are connected to the 'LOB functional analytics and action item' node 316. For example, the 'impact score distribution to strategy' 308 affects/contributes to the final output of the network. Hence, relationship 'R11' is established between 'entity and topic distribution to current plan' 310 and 'LOB functional analytics and action item' node 316. Similarly, relationship 'R12' is established between the nodes 'impact score distribution to strategy' 308 and 'LOB functional analytics and action item' 316. Relationship 'R13' is established between the nodes 'source impact score' 306 and 'LOB functional analytics and action item' 316. The data extracted from the complaint is used for calculating the entity and topic distribution to the current plan. Hence, relationship 'R14' is established between 'entity and topic distribution to current plan' 310 and 'filter data for relevance' node 302.

Figure 3B:
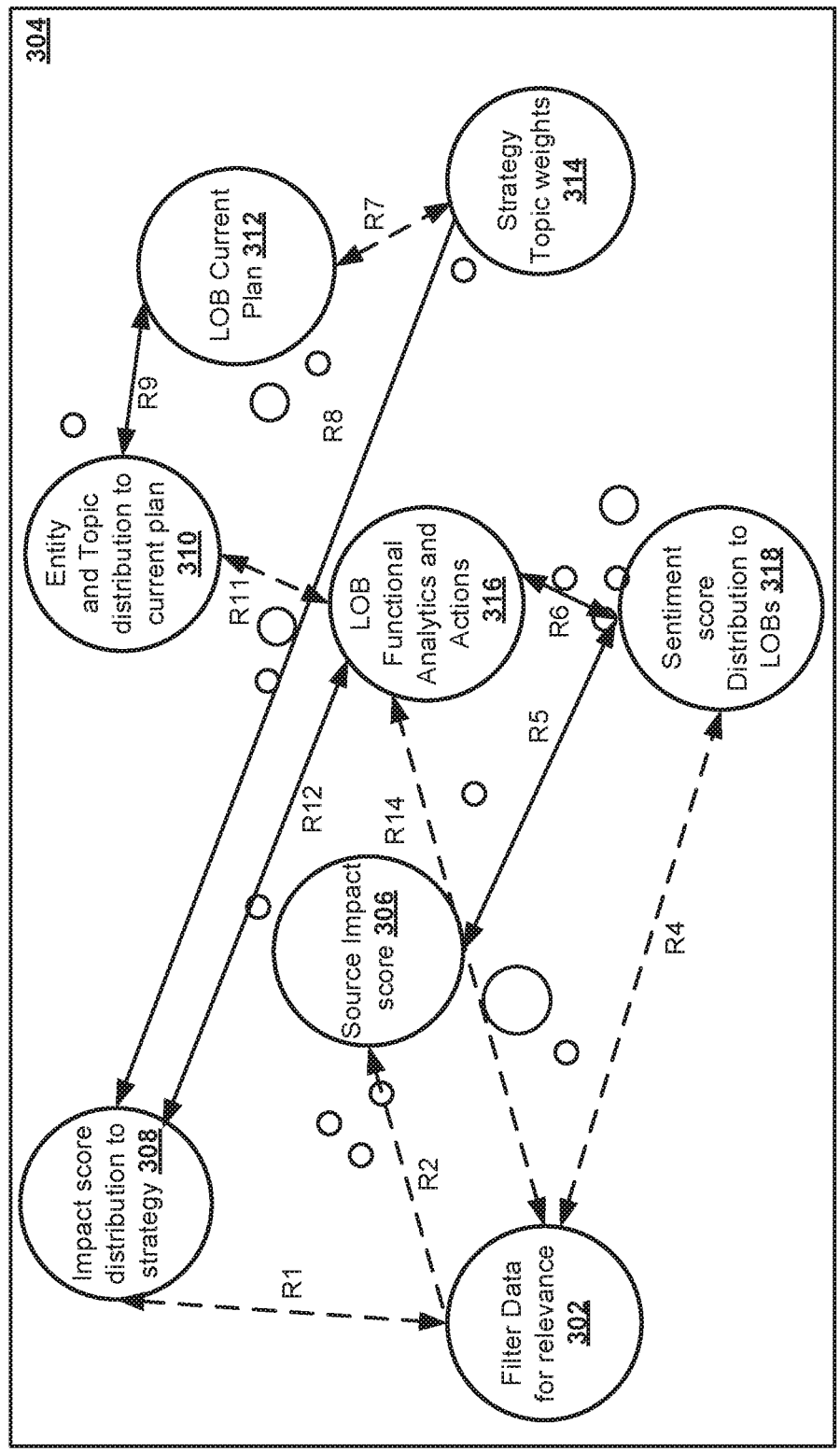
FIG. 3B is an exemplary graph neural network representing an evolved set of neural nodes and an evolved set of relationship between the evolved set of neural nodes, according to one embodiment.

FIG. 3B is an exemplary graph neural network representing an evolved set of neural nodes and an evolved set of relationship between the evolved set of neural nodes, according to one embodiment. The inferential function $F_{relation}$ determines the relationship between the neural nodes such as direct relationship or indirect relationship. $F_{relation}$ is a statistical inferential function of 'behaviors' to identify whether the relationship between the neural nodes constitute a direct relationship or an indirect relationship that requires a new node to set be as a bridge. In the case of a direct relationship, $F_{relation}$ inferential function in combination with the inferential function $F_{score}$ is used to set the directional relationship between the neural nodes. In the case of indirect relationship, the new node and the relationship with the new node will be set based on the functions $F_{new\ node}$ and $F_{score}$. For example, during evolution or learning of the neural network 304, it is determined that no relationship is required between the neural nodes 'entity and topic distribution to current plan' 310 and 'filter data for relevance' 302. Hence, the relationship 'R14' as shown in FIG. 3A is removed. Whereas the neural node 'source impact score' 306 (affects, changes, influences) 'sentiment score distribution to LOB' 318. Null hypothesis is determined using the inferential function $F_{relation}$ $\{F_{score}\} \geq F_{threshold}$ (Normal distribution). Here F threshold inferential function is used to compare the threshold derived with an acceptable threshold based on the current distribution for acceptance. Normal distribution represents the current distribution pattern of the neural network 304. For example, in the case of normal distribution, the threshold for acceptance will be 95%.

In the case of the neural nodes 'source impact score' 306 and 'sentiment score distribution to LOB' 318, the null hypothesis holds true and there is a direct relationship between the neural nodes. The strength of the relationship 'R5' increases over a period of time, and a direct relationship 'R5' continues between the nodes 'source impact score' 306 and 'sentiment score distribution to LOB' 318. If the inferential function or equation $F_{relation}$ $\{F_{score}\} < F_{threshold}$ (Normal distribution) holds true and the null hypothesis being false, implies that there is no direct relationship between the neural nodes. If the null hypothesis is false, then a new node such as 'node x' which satisfies the following relationship 'source impact score' 306 (affects, changes, influences) 'node X' which (affects, changes, influences) node 'sentiment score distribution to LOB' 318' becomes active from the dormant set. The threshold value for this case should remain the same i.e. Normal Distribution of 95%. If 'node X' satisfies this threshold value, then 'node X' becomes active from the dormant state and an indirect relationship is established between the nodes 'source impact score' 306 and 'sentiment score distribution to LOB' 318 via 'node X'.

$F_{traversal}$ inferential function represents the traversal count of the related neural nodes in the neural network 304. $F_{traversal}$=Count (number of times a neural node has been hit) inferential function is used to compute the neural node traversal count for the individual neural nodes. Based on the new and historic data, inferential function $F_{traversal}$ is used to dynamically compute the change in weights of the node and the strength of the relationships across neural network 304. This function will continue optimization of the neural network 304 even in the absence of a stimulus/input. The first neural node of the neural network 304 will remain as 'filter data for relevance' 302. The other neural nodes connected to 'filter data for relevance' node 302 shall process in parallel and contribute to the next set of nodes connected to them. The individual neural nodes would cross-reference each other and run recursively. Finally, 'LOB functional analytics and action items' 316 would collate the inputs received from various other neural node and generate a snapshot of data enabling generation of LOB specific reports with action items.

Figure 4:
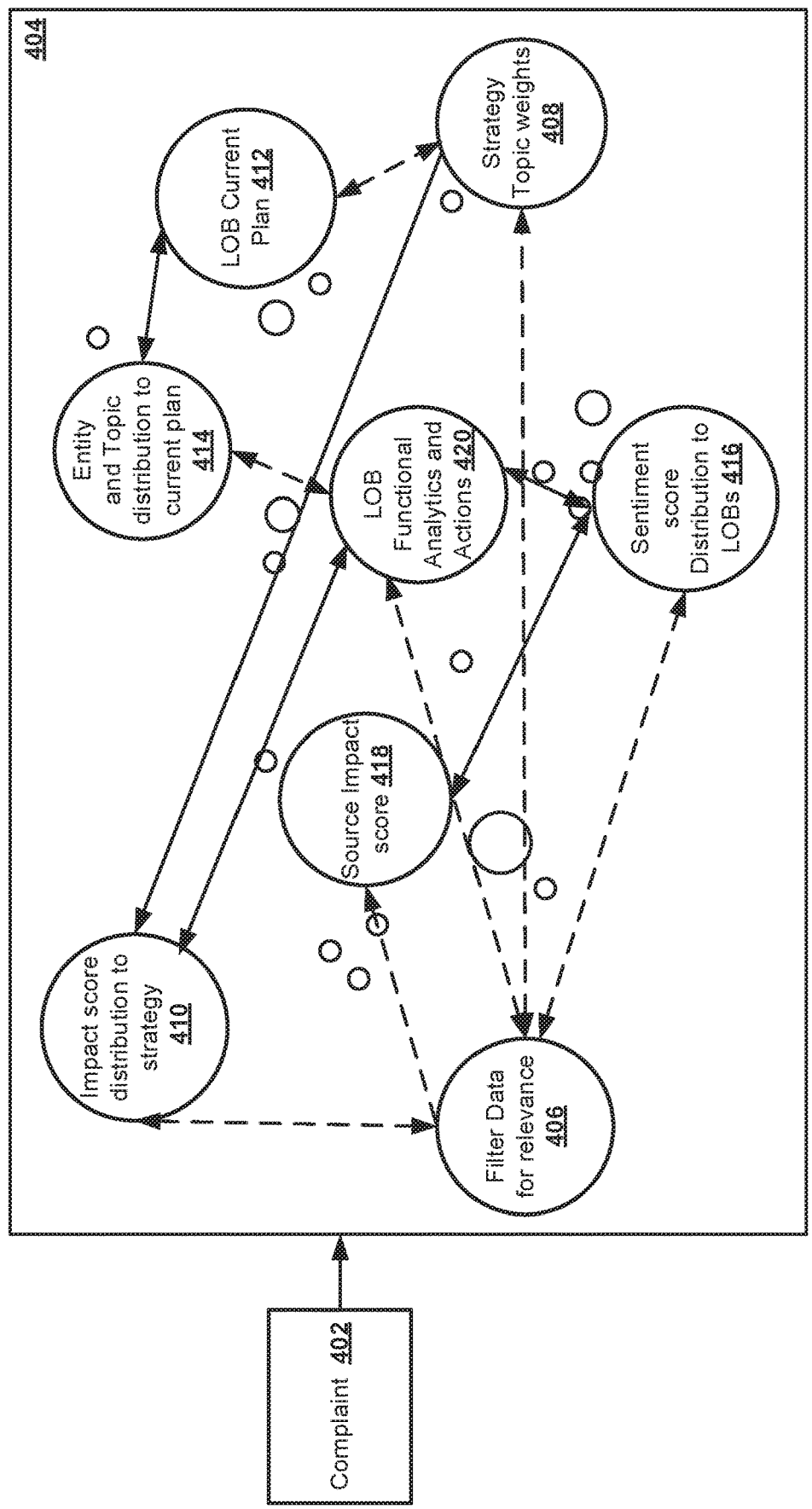
FIG. 4 is an exemplary use case illustrating inferential analysis and reporting of contextual complaints data, according to one embodiment.

FIG. 4 is an exemplary use case illustrating inferential analysis and reporting of contextual data, according to one embodiment. Consider a scenario where 'user A' using social media network 'SMN' posts a message 'tire X not holding up in city A' in the social media network 'SMN'. This message includes a complaint regarding the tire X model. $F_{chunk}$ inferential function takes multiple inputs and reduces and converts to abstracted chunks. For example, the complaint 402 'tire X not holding up in city A' is provided as input to $F_{chunk}$ inferential function and is abstracted to identify an entity of interest i.e. 'tire'. Such as abstraction helps in determining the entity or entities of interest the complaint 402 focuses on. The $F_{chunk}$ inferential function is available in various neural nodes such as 'LOB functional analytics and actions' 420, 'LOB current plan' 412 and the strategy topic weights 408. In one embodiment, the various neural nodes such as 'LOB functional analytics and actions' 420, 'LOB current plan' 412 and the strategy topic weights 408 may act as functional chunking nodes. The complaint 402 is received as an input at the neural network 404. The first neural node 'filter data for relevance' 406 receives the input. The neural node 'filter data for relevance' 406 extracts or chunks the entity of interest i.e. tire X, and determines the relevance of the entity of interest in association with the complaint. It is determined that the importance or relevance of the complaint is relatively 'high' based on the criticality of the entity of interest e.g. tire X that is discussed in this social media message. In other cases, depending on the context of the message or complaint, relevance is determined by the 'filter data for relevance' 406 neural node. Based on the input message received, processing is done by the next neural node 'strategy topic weights' 408, where the strategy topics affected by the complaint 402 is determined.

For example, with reference to the message 'tire X not holding up in city A', the strategy topics affected as determined by 'strategy topic weights' 408 are 'individual premium mobility', 'inspire people' and 'excellent results'. These 3 strategy topics have a direct impact based on the message received from the complaint 402. The message is further received by the connected neural node 'impact score distribution to strategy' 410, where a score is computed for the individual strategy topics determined at the previous neural node based on the impact level. For example, a score is calculated for the individual strategy topics as, 'individual premium mobility' with a score of '8' out of '10', 'inspire people' with a score of '9' out of '10' and 'excellent results' with a score of '8' out of '10'. This implies that the winter tire complaint has a significant negative impact on the strategy with a maximum score. $F_{score}$ scoring function is used to compute the score of individual strategy topics. $F_{score}=\{y:y\in(\text{relevance scores (Strategies, LOBs, sentiments, source impact, ... ))}\}$. Based on the contribution of objectives or strategies set for the LOBs there will be a major influence on the entities scored. For example, based on the relevance of the strategy topic 'individual premium mobility' to the objective of the LOB strategy, the scoring function $F_{score}$ will determine the score as '8'. The scale of scoring can be predefined by the enterprise.

The 'LOB current plan' 412 neural node receives the input from the previous node 'impact score distribution to strategy' 410. The 'LOB current plan' 412 that extracts the current plan of various LOBs within the enterprise. For example, the marketing department might have a marketing campaign 2021 relating to safety and experience. Similarly, the research and development department may be focused on getting a smoother breaking index, and the production department may be focused on increasing the production of winter tire year on year. 'LOB current plan' 412 extracts the current plan of various LOBs that will have an impact because of the complaint 402 received from the social media. The LOB plans are taken into consideration to check the impact of the complaint over the plan. For example, if thousands of complaints were logged for poor quality of winter tier of a specific grade and brand, there is a possibility of proposing an upsell campaign to the marketing LOB for a higher-end tier. The 'entity and topic distribution to current plan' 414 neural node receiving the message from the previous node, determines the impact of the message on the LOBs. For example, the marketing department's plan is affected, and the extent is determined with a score of '5'. Similarly, the extent of research and development department being affected is determined with a score of '8' and the extent of production department being affected is determined with a score of '7'. $F_{score}$ scoring function is used to compute the extent of impact on the LOBs. $F_{score}=\{y: y\in(\text{relevance scores (Strategies, LOBs, sentiments, source impact, ... ))}\}$. Using the scoring function $F_{score}$ the extent of research and development department being affected is determined with a score of '8'. $F_{score}$ is a generic scoring function which receives specific set of inputs in a specific neural node. Based on the inputs received, the scoring function $F_{score}$ computes the score. The scoring function $F_{score}$ is customizable and is designed in a generic manner to score entities across various neural nodes.

The sentiment score of the individual LOBs is determined in the node 'sentiment score distribution to LOBs' 416. The sentiment score of '8' is determined for the marketing LOB, sentiment score of '8' is determined for the research and development department and the sentiment score of '6' is determined for the production department. The reason for the score calculation is that the 'Sentiment Factor' revolving around marketing and safety is higher for the entity of interest tire. The sentiment Factor is high for the research and development LOB and low for production LOB since production has lesser impact compared to research and development. The inputs for the sentiment score computation is received from a master data as explained in FIG. 2 along with the complaint 402. The master data receives strategy related information from the enterprise strategies and tactics and lets the sentimental analysis be performed on that data by the semantical sentiment analysis engine. The processed data at the master data is fed as input to the neural network 404. The 'source impact score' 418 determines the impact of the complainant corresponding to the complaint 402 on the enterprise. For example, based on the complaint 402 received, the impact on the 'enterprise A' is determined in this node. The 'LOB functional analytics and actions' 420 neural node, collates the functional outputs from the other individual neural nodes in the neural network 404, and generates a snapshot to enable generation of reports with insights and actions items for the specific LOBs that has an impact of the received complaint 402. Since, the neural nodes in the neural network 404 generate, re-generate and de-generate dynamically, a snapshot of any of the individual neural node may be generated at that point of time. The snapshot includes information to generate report. Based on the functional implementation of the neural nodes, the kind of data or output generated by the neural nodes may be chunked information of entities or scored information of entities. This information may be in a structural format such as Extensible Markup Language (XML) where the structural and the relationship of the entities are available. The usage of the inferential function in the neural nodes for a specified functional working of the node, influences the structure and relationship of the entities. For example, the snapshot generated from the 'LOB functional analytics and actions' 420 neural node may include an XML file with structure and relationship such as 'Tire testing' within the 'Research and development' LOB. This snapshot is provided to an enterprise application e.g. enterprise reporting application to generate a report as shown in FIG. 5A and FIG. 5B.

Figure 5A:
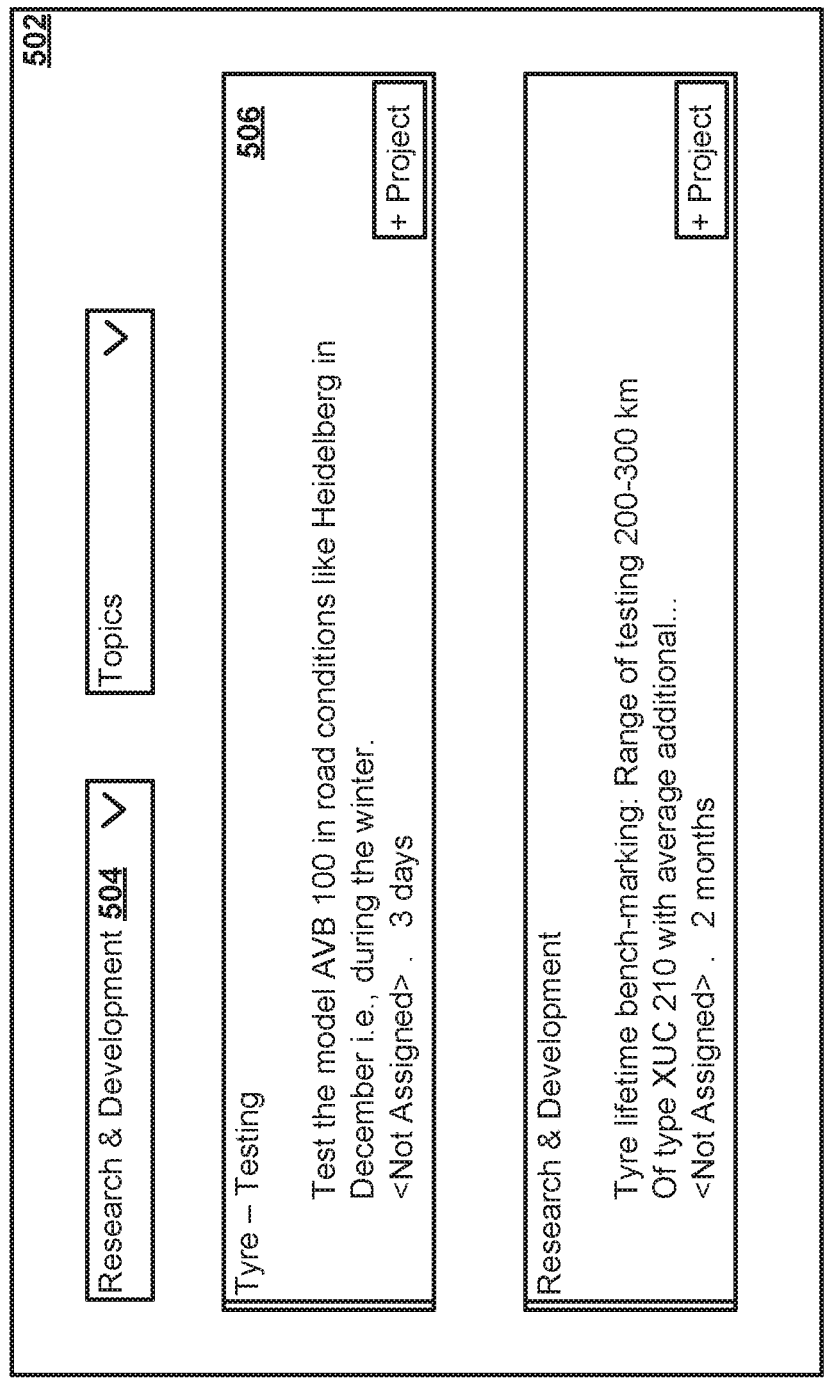
Figure 5C:
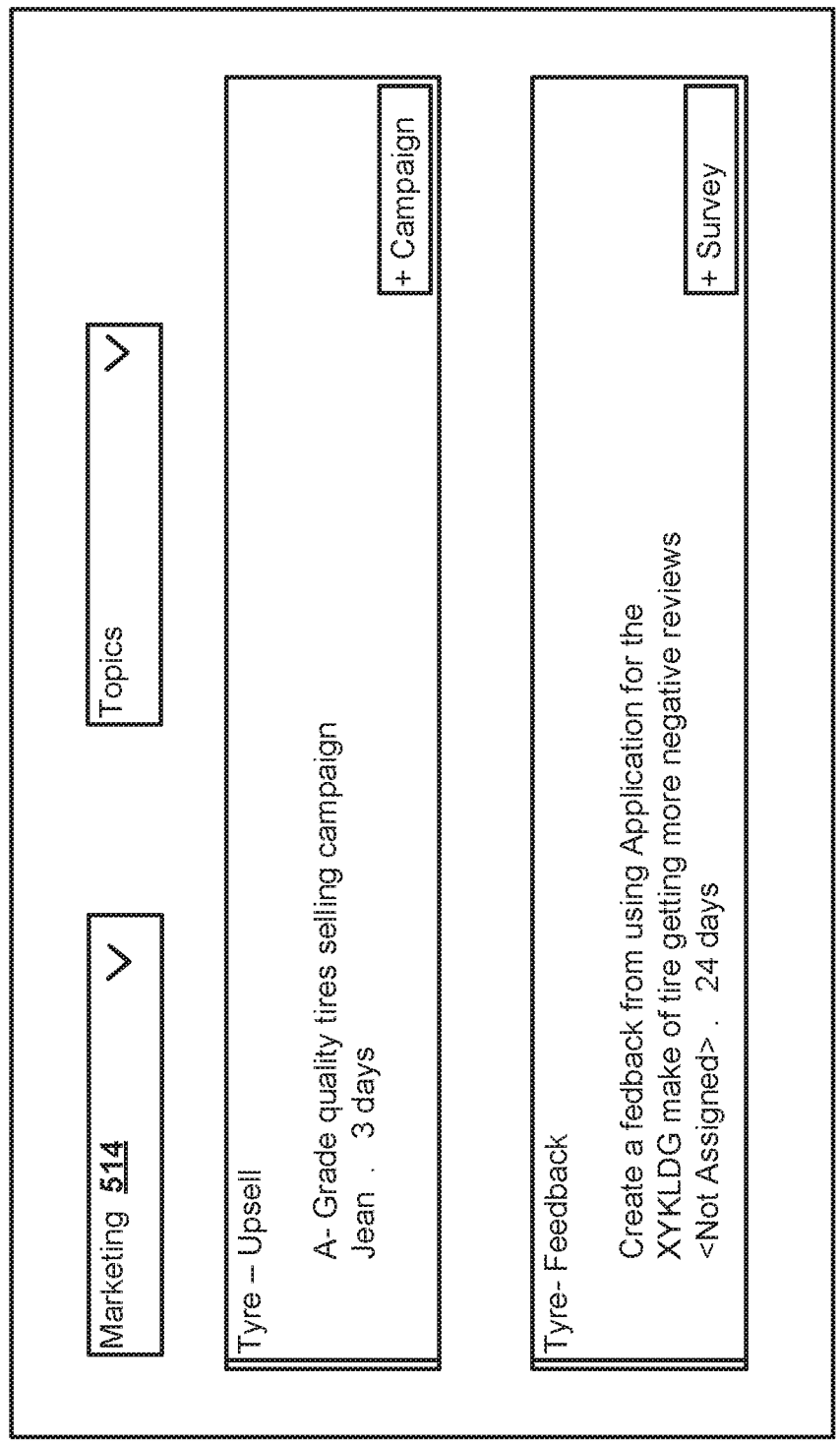

FIG. 5A and FIG. 5B in combination illustrates a sample report with action items, according to one embodiment. With reference to the example described in FIG. 4, the output in the form of action items is rendered in the report 502. The action items are associated with 'research and development' 504 Line of Business (LOB) or team. These action items can be viewed in a user interface or reports dashboard associated with the 'research and development' LOB as shown in the report 502. The 'research and development' 504 LOB/team may receive these action items sorted by priority and such action items are assigned to team members for execution. When an individual action item is selected, the list of complaints corresponding to the action item of the 'research and development' 504 team may be viewed. For example, when the action item 506, is selected, a pop-up screen 508 is displayed as shown in FIG. 5B. The pop-up screen 508, shows the list of complaints 510 received from the user. The details of the individual complaints are displayed for the team member to work on. Create project 512 button is clicked to create a project to test the tire in road conditions during winter. This project may be assigned to a specific team member in the report application to work on. FIG. 5C shows the action items listed for the marketing 514 team. The action items may be received in the form of a report. The marketing team members may create a campaign, or a survey based on the action items. Depending on the team or LOB, action items may vary such as create project or create campaign or create survey. These action items may be assigned to members of the specific team or LOB for acting on them.

Figure 6A:
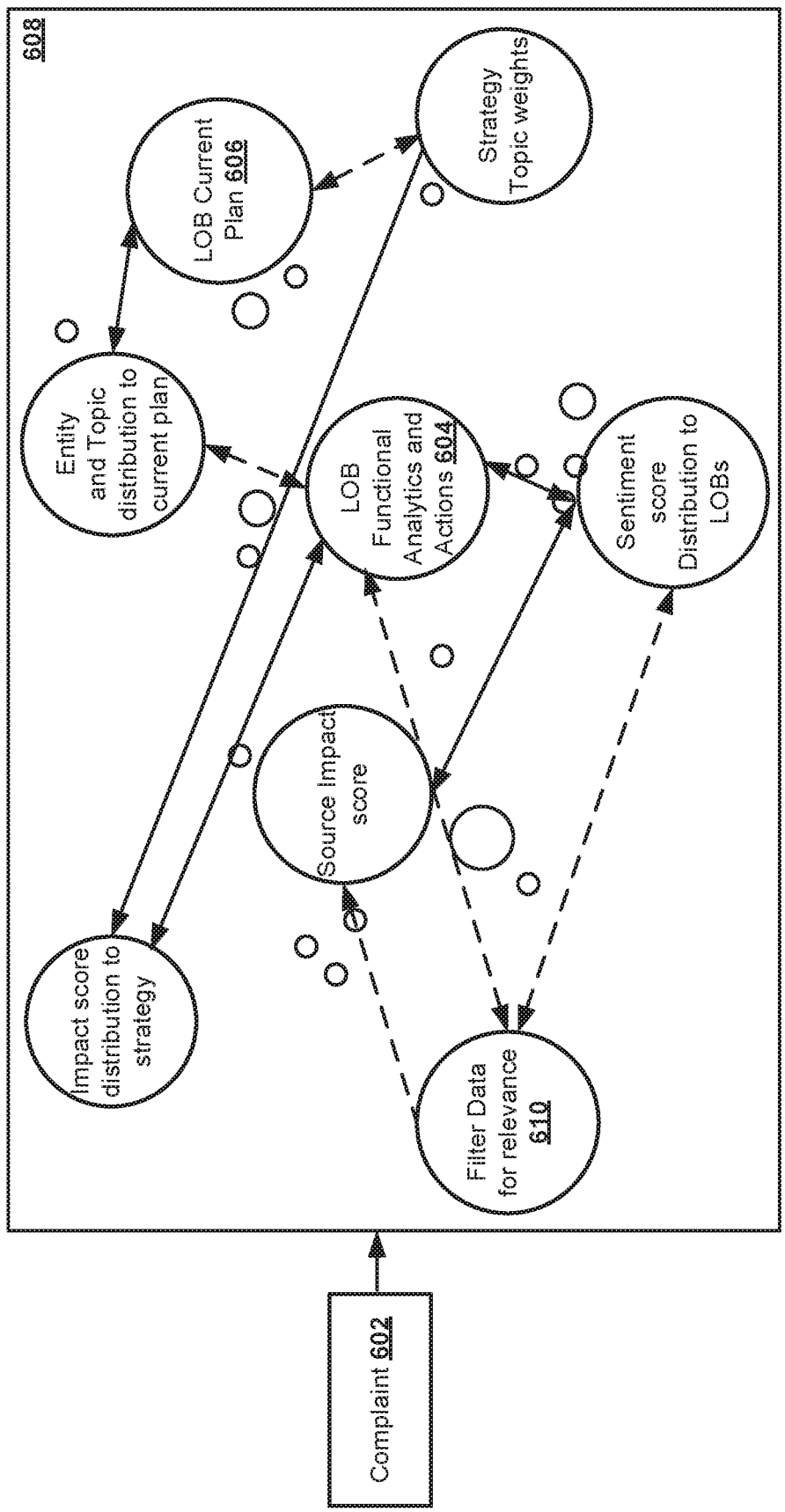
FIG. 6A and FIG. 6B in combination illustrates an exemplary use case of inferential analysis and reporting of contextual complaints data, according to one embodiment.
Figure 6B:
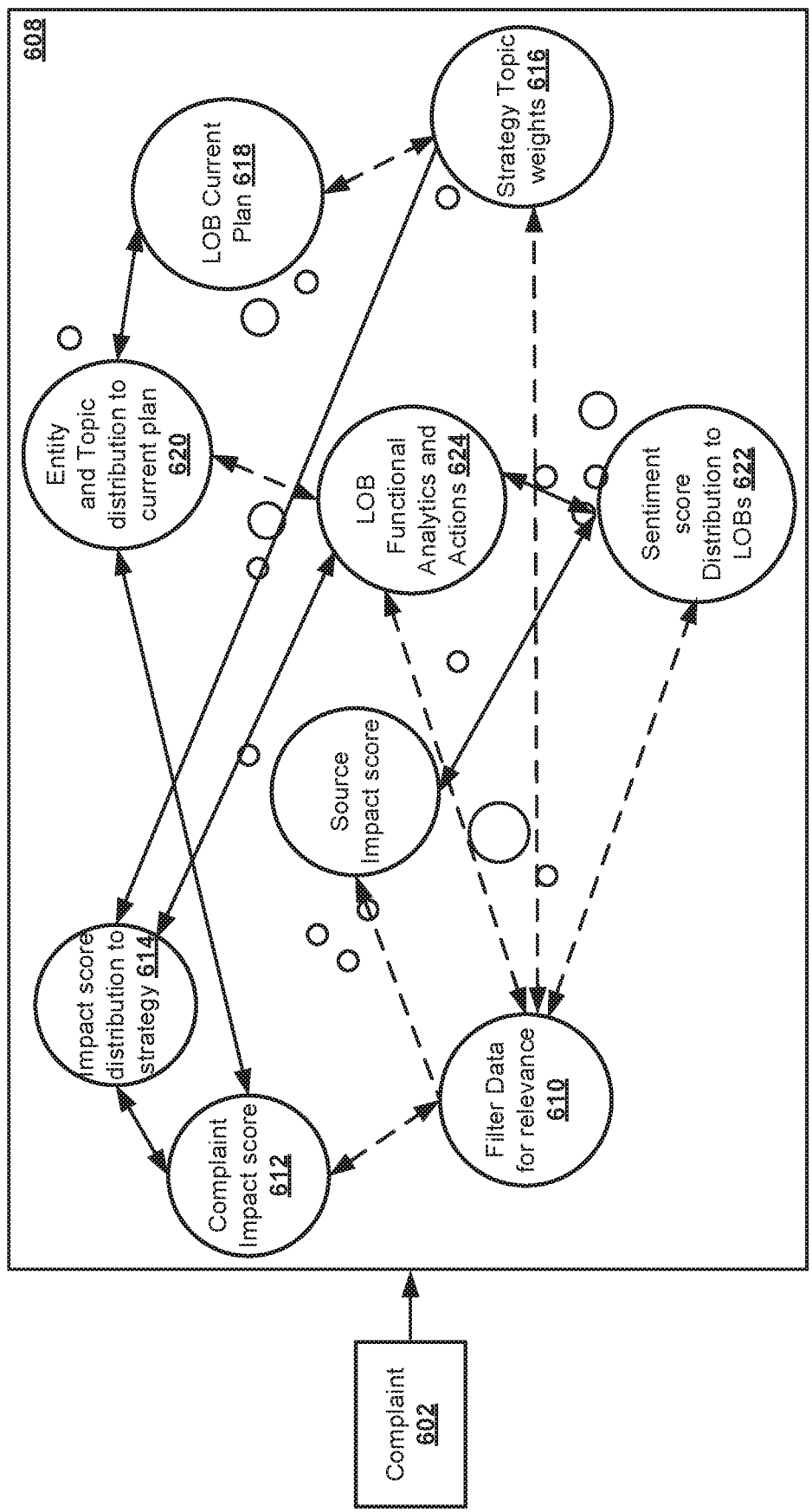

FIG. 6A and FIG. 6B in combination illustrates an exemplary use case of inferential analysis and reporting of contextual complaints data, according to one embodiment. Consider a scenario where 'user B' using social media network 'FB' posts a message 'Back in 2012, we bought Model AVB 100. Last week, with 50,000 miles on it the water pump broke and needed to be replaced which ended up being very expensive'. This message is formulated as complaint 602 regarding a specific model of water pump. $F_{chunk}$ chunking function or inferential function takes the message posted on 'FB' as input and reduces and converts to abstracted chunks. For example, the complaint 602 'Back in 2012, we bought Model AVB 100. Last week, with 50,000 miles on it the water pump broke and needed to be replaced which ended up being very expensive' is provided as input to the $F_{chunk}$ inferential function and is abstracted to entities of interest to an enterprise such as 'water pump AVB 100'. Such an abstraction helps in determining the entity of interest the complaint 602 focuses on. The $F_{chunk}$ chunking function is available in various neural nodes such as 'LOB functional Analytics and Actions' 604, 'LOB current plan' 606 and the 'strategy topic weights'. The complaint 602 is received as an input at the neural network 608.

The first neural node 'filter data for relevance' 610 receives the input. The neural node 'filter data for relevance' 610 extracts the entity i.e. 'water pump' and determines the relevance of the entity in association with the complaint 602. It is determined that the importance or relevance of the complaint is relatively 'high' based on the criticality of the entity of interest e.g. 'water pump' that is discussed in this social media message. In other cases, depending on the context of the message or complaint, relevance is determined by the 'filter data for relevance' 610 neural node. A trained neural network is optimized to handle inputs that are within the scope of the neural network. Beyond that, a single new stimulus will make the entire neural network active and the functional/network functions will start optimizing the neural network. In the use case illustrated above, the entity 'water pump' abstracted from the complaint 602 initiates optimization of the neural network 608, because the entity 'water pump' is a new entity for the neural network 608. During optimization, the neural nodes either move to the dormant state from active state or move from dormant state to active state depending on the training of the neural network 608.

Inferential function $F_{new\ node}=F(F_{score},F_{relation},F_{chunk},F_{traverse})$ determines whether a new node and a relationship to the new node is required. Here, $F_{score}$ scoring function is used to compute the initial score of the new node. $F_{score}=\{y: y\in(\text{relevance scores (Strategies, LOBs, sentiments, source impact, ...)})\}$. Based on the contribution of objectives or strategies set for the LOBs there will be a major influence on the new neural node scored. If the score determined for the new neural node is above a pre-defined threshold, then the new neural node will be moved from the dormant state to the active state. In case the score determined for the new neural node does not meet the pre-defined threshold, the new node may not be moved from the dormant state to the active state. In the neural network 608, the inferential function $F_{new\ node}$ determines that a new node 'complaint impact score' 612 is required, hence the new node 'complaint impact score' 612 is activated from the dormant state as shown in FIG. 6B.

$F_{relation}$ determines the relationship between the neural nodes such as determination of direct relationship or indirect relationship. Here, the inferential function or equation F relation $\{F_{score}\}<F_{threshold}$ (Normal distribution) holds true and the null hypothesis being false implies that there is no direct relationship between the neural nodes 'filter data for relevance' 610 and 'impact score distribution strategy' 614. If the null hypothesis is false, then a new node such as 'complaint impact score' 612' which satisfies the following relationship 'filter data for relevance' 610 (affects, changes, influences) 'complaint impact score' 612' which (affects, changes, influences) node 'impact score distribution strategy' 614 becomes active from the dormant state. The threshold value for this case may remain the same i.e. Normal Distribution of 95%. If 'complaint impact score' 612' satisfies this threshold value, then the 'complaint impact score' 612' becomes active from the dormant state and an indirect relationship is established between the nodes 'filter data for relevance' 610 and impact score distribution strategy' 614 via 'complaint impact score' 612'. Using $F_{chunk}$ inferential function abstracted inputs from the complaint 602 received are stored in the new node 'complaint impact score' 612.

In the 'complaint impact score' 612 neural node, a score associated with the impact of the complaint is determined. For example, a score of '3' is calculated for the impact of the complaint 602. $F_{score}$ scoring function is used to compute the score of impact of the complaint. $F_{score}=\{y:y\in(\text{relevance scores (Strategies, LOBs, sentiments, source impact, ...)})\}$. $F_{score}$ determines score of '3' for impact of the complaint 602 on the objective of the strategies, LOBs.

Based on the input message received, processing is done by the next neural node 'strategy topic weights' 616, where the strategy topics affected by the complaint 602 is determined. For example, with reference to the complaint 602, 'Back in 2012, we bought Model AVB 100. Last week, with 50,000 miles on it the water pump broke and needed to be replaced which ended up being very expensive', the strategy topics affected as determined by 'strategy topic weights' 616 are 'individual premium mobility', 'inspire people' and 'excellent results'. These three strategy topics have a direct impact on the message received from the complaint 602. Any number of neural nodes connected to a specific node is processed in parallel. In a scenario where a specific neural node is dependent on inputs or information from a previous node, that specific node waits to receive the inputs. The use case illustrated here is not binding on a specific sequence or order of execution. Depending on the enterprise requirements and the use case, the execution of the neural nodes in the neural network may be executed in parallel and/or sequence. The message is further received by the connected neural node 'impact score distribution to strategy' 614, where a score is computed for the individual strategy topics determined at the previous neural node based on the impact level. For example, a score is calculated for the individual strategy topics as, 'individual premium mobility' with a score of '4' out of '10', 'inspire people' with a score of '3' out of '10' and 'excellent results' with a score of '2' out of '10'. $F_{score}$ scoring function is used to compute the score of individual strategy topics. $F_{score}=\{y:y\in(\text{relevance scores (Strategies, LOBs, sentiments, source impact, ...)})\}$. Based on the contribution of objectives or strategies set for the LOBs there will be a major influence on the entities scored.

The 'LOB current plan' 618 neural node receives the input from the previous node 'impact score distribution to strategy' 614. The 'LOB current plan' 618 extracts the current plan of various LOBs within the enterprise. For example, the marketing department might have a marketing campaign 2021 relating to safety and experience. Similarly, the research and development department may be focused on getting a better coolant system, and the production department may be focused on increasing the production of water pump by 5% year on year. 'LOB current plan' 618 extracts the current plan of various LOBs that will have an impact because of the complaint 602 received from the social media. The 'entity and topic distribution to current plan' 620 neural node receiving the message from the previous node, determines the impact of the message on the LOBs. For example, the marketing department's plan is affected, and the extent is determined with a score of '5'. Similarly, the extent of research and development department being affected is determined with a score of '2' and the extent of production department being affected is determined with a score of '3'. $F_{score}$ scoring function is used to compute the extent of impact on the LOBs. $F_{score}=\{y:y\in(\text{relevance scores (Strategies, LOBs, sentiments, source impact, ...)})\}$.

The sentiment score of the individual LOBs is determined in the node 'sentiment score distribution to LOBs' 622. The sentiment score of '2' is determined for the marketing LOB, sentiment score of '3' is determined for the research and development department and the sentiment score of '2' is determined for the production department. The reason for the score calculation is that the 'sentiment factor' revolving around marketing and safety is higher for the entity water pump. The 'LOB functional analytics and actions' 624 neural node, collates the functional outputs from the other individual neural nodes in the neural network 608 and generates a snapshot for generation of report with insights and actions items for the specific LOBs that has an impact of the received complaint 602.

Figure 7:
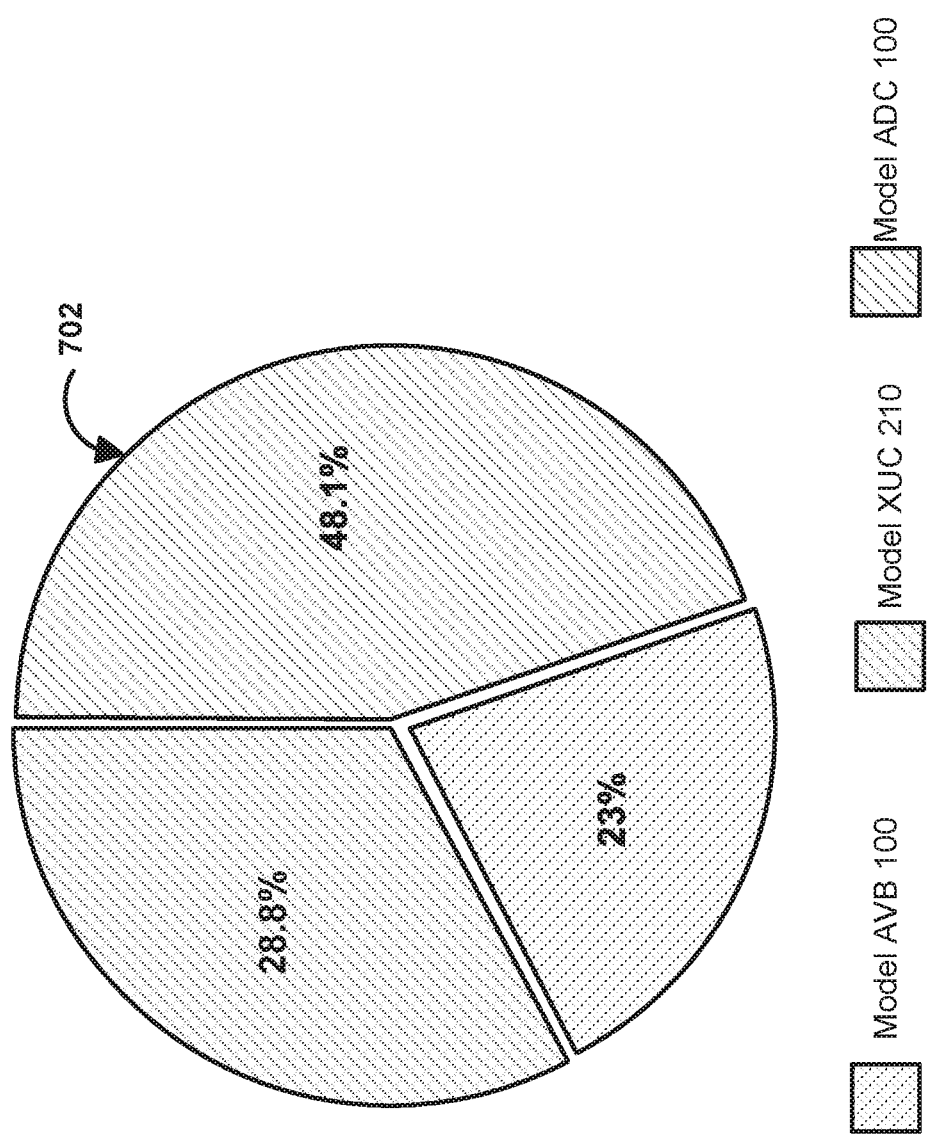
FIG. 7 illustrates a sample report, according to one embodiment.

FIG. 7 illustrates a sample report, according to one embodiment. With reference to the use case illustrated in FIG. 6A and FIG. 6B, report 702 is generated for 'research and development' LOB. Since the impact of the complaint 602 illustrated in FIG. 6B was low, insights are generated for the 'research and development' LOB. The report 702 does not include any action item because the impact score is low. The report 702 shows insights for the 'research and development' LOB with number of complaints logged for water pump corresponding to specific models. The number of complaints logged for Model AVB 100 is 23%, for model XUC 210 is 28.8% and for model ADC 100 is 48.1%.

Figure 8:
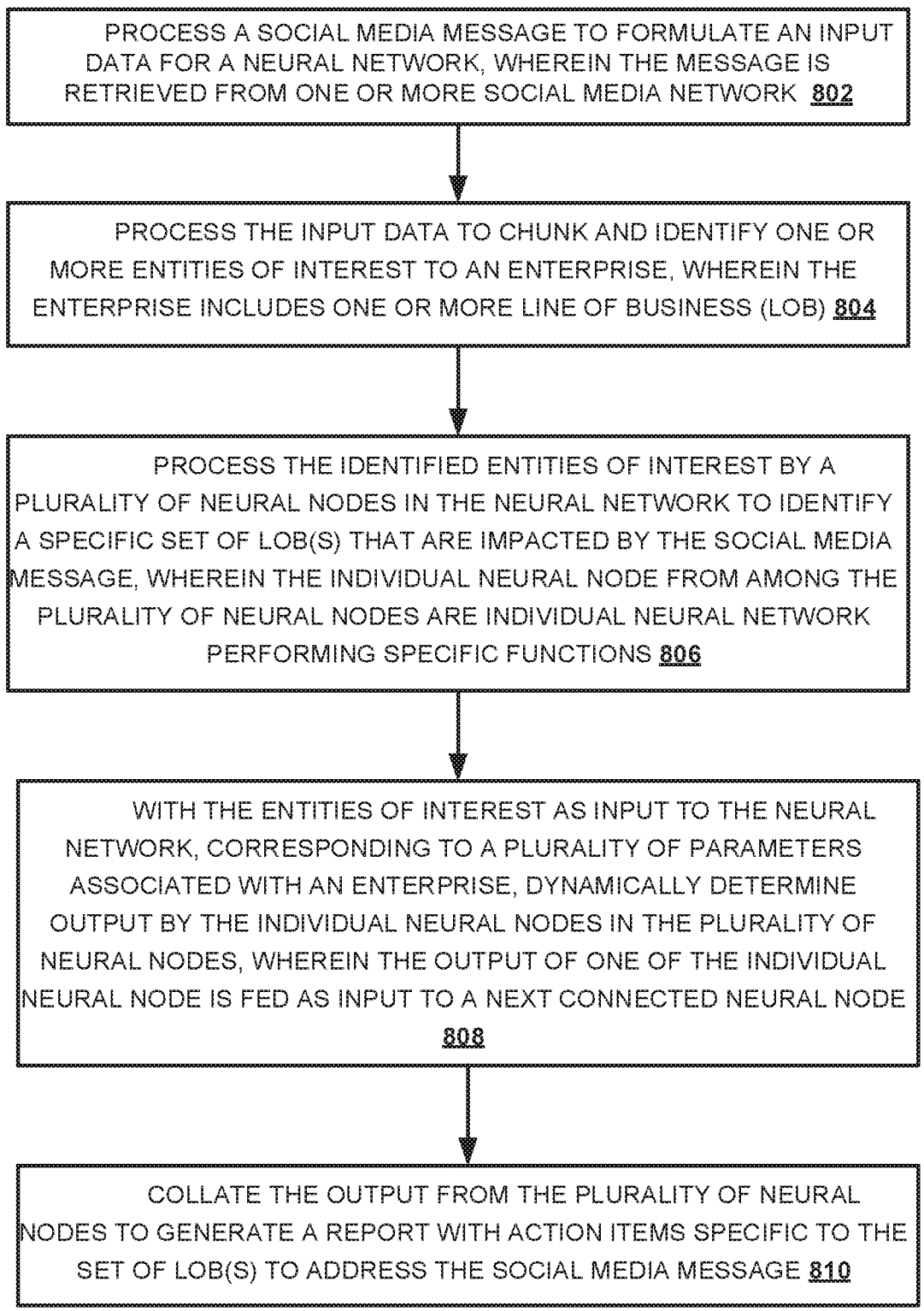
FIG. 8 is flow chart illustrating a process of inferential analysis and reporting of contextual data, according to one embodiment.

FIG. 8 is flow chart illustrating a process of inferential analysis and reporting of contextual data, according to one embodiment. At 802, a social media message is processed to formulate an input data for a neural network. The message is retrieved from one or more social media network. At 804, the input data is processed to chunk and identify one or more entities of interest to an enterprise. The enterprise includes one or more line of business (LOB). At 806, the identified entities of interest are processed by a plurality of neural nodes in the neural network to identify a specific set of LOB(s) that are impacted by the social media message. The individual neural node from among the plurality of neural nodes are individual neural network performing specific functions. With the entities of interest as input to the neural network, corresponding to a plurality of parameters associated with an enterprise, at 808, output by the individual neural nodes from among the plurality of neural nodes is dynamically determined. The output of one of the individual neural nodes is fed as input to a next connected neural node. At 810, the output from the plurality of neural nodes is collated to generate a report with action items specific to the set of LOB(s) to address the social media message.

The embodiments described above have the advantages stated below. The consumer voice is heard across the business chain. Complaints and feedback received from the consumers are sent for analysis to the LOBs that are impacted. Not just LOBs that are impacted the most, but also LOBs that have lower impact. The feedback or complaint raised by a consumer in social media is converted as action items and provided to the impacted LOBs in the Enterprise. Thus, the full cycle of a complaint/feedback addressal system is established. At times, critical business decisions are made from the hidden patterns observed in consumer complaints analysis. These inferential analytical reports and data will also help the enterprise take pre-emptive measures which will help prevent huge losses to the enterprise. Enterprises that are focused on consumer products and services will benefit greatly from the inferential analysis and reporting of contextual data. For example, the analysis enables various LOBs such as manufacturing to determine if their quality of the spare part meets a certain usage criterion. Planning LOB ensures that inaccurate and time-consuming forecasting processes are eliminated. Finance LOB ensures managing the budget efficiently without compromising the quality of the spares. Procurement LOB enables procuring the material from the right vendor. The vendor evaluation process should be appropriate. Marketing LOB helps in allocating appropriate amount of resources for each automobile model. Social media data which is the best representation of an end-user or consumer providing the genuine granular detail reaches the enterprise. Based on the inferential analysis and reporting of contextual data, challenge of the enterprises to collect, analyze and use such social media data has become possible. The specific social media data reaches a corresponding division or department or LOB within the enterprise.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
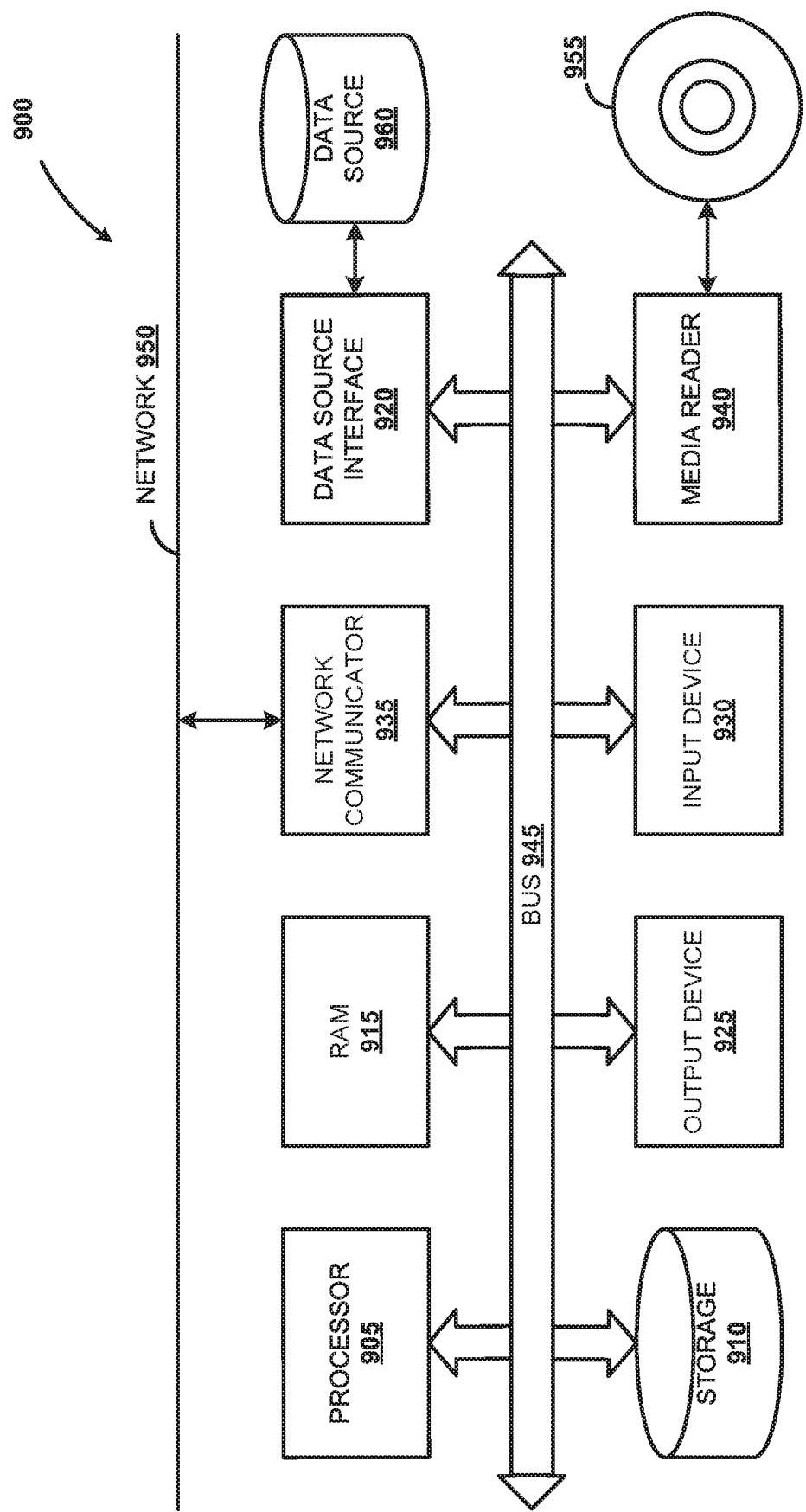
FIG. 9 is a block diagram of an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receiving a feed comprising a social media message from one or more social media platforms, the social media message comprising a complaint relating to a particular product;
   processing the social media message to formulate first input data for a graph neural network;
   receiving master data comprising second input data for the graph neural network, the second input data comprising ranked enterprise strategies obtained from a data storage device;
   receiving respective relationships and associated impact scores between individual neural nodes of the graph neural network, wherein a first relationship between a first neural node and a second neural node comprises a direct relationship, and a second relationship between the first neural node and a third neural node comprises an indirect relationship, and, in response to determining the indirect relationship, determining a new node to be a bridge between the first neural node and the third neural node;
   maintaining a traversal count for the individual neural nodes of the graph neural network during a training period while refining the graph neural network, the traversal count indicating a number of times each of the individual neural nodes is hit during the training period, computing respective weights for the individual neural nodes based on the traversal count, and deactivating at least one of the individual neural nodes based on the traversal count;
   processing the first input data by applying a chunking function to identify one or more entities of interest to an enterprise, wherein the enterprise includes one or more line of business (LOB) relating to the particular product;
   processing the identified one or more entities of interest by a plurality of neural nodes in the graph neural network, based on the respective relationships, weights, and associated impact scores, to identify a specific set of LOB(s) that are impacted by the social media message, the level of impact of each individual LOB of the specific set of LOB(s) being indicated by the associated impact scores, wherein an individual neural node from among the plurality of neural nodes performs specific functions;
   refining respective rankings of the ranked enterprise strategies based on the refinement of the graph neural network;
   with the one or more entities of interest as input to the neural network, corresponding to a plurality of parameters associated with the enterprise, dynamically determining an output by the individual neural nodes in the plurality of neural nodes, wherein the individual neural nodes connected to one of the neural node are processed in parallel;
   collating the output from the plurality of neural nodes to generate a report with action items corresponding to the specific set of LOB(s) to address the complaint of the social media message; and
   transmitting the report to an application to render the report to a user.

2. The computer-readable medium of claim 1, further comprises instructions which when executed by the computer further cause the computer to:
   receive the plurality of parameters as strategies and tactics information of the enterprise;
   perform sentiment analysis on the received strategies and tactics information to generate master data; and
   feed the generated master data to the neural network.

3. The computer-readable medium of claim 1, wherein processing the identified one or more entities of interest by a first set of neural nodes from among the plurality of neural nodes in the neural network comprises instructions which when executed by the computer further cause the computer to:
   based on a first inferential function, determine whether a null hypothesis holds true between the first set of neural nodes; and
   upon determining that the null hypothesis exists, infer that a direct relationship exists between the first set of neural nodes.

4. The computer-readable medium of claim 3, further comprises instructions which when executed by the computer further cause the computer to:
   upon determining that the null hypothesis does not hold true and a second inferential function is satisfied, infer that an indirect relationship exists between the first set of neural nodes and an intermediate bridge node is activated and used to connect the first set of neural nodes.

5. The computer-readable medium of claim 1, further comprises instructions which when executed by the computer further cause the computer to:
   based on inputs provided to a scoring function in a neural node, determine a score by the neural node, wherein the scoring function is a generic scoring function used by the plurality of neural nodes.

6. The computer-readable medium of claim 1, further comprises instructions which when executed by the computer further cause the computer to:
   dynamic training of the neural network results in dynamic generation, re-generation and de-generation of the plurality of the neural nodes and relationship between the neural nodes, to improve accuracy of the output from the individual neural nodes.

7. A computer-implemented method of inferential analysis and reporting of contextual complaint data, the method comprising:
   receiving a feed comprising a social media message from one or more social media platforms, the social media message comprising a complaint relating to a particular product;
   processing the social media message to formulate first input data for a graph neural network;
   receiving master data comprising second input data for the graph neural network, the second input data comprising ranked enterprise strategies obtained from a data storage device;

determining respective relationships and associated impact scores between individual neural nodes of the graph neural network, wherein a first relationship between a first neural node and a second neural node comprises a direct relationship, and a second relationship between the first neural node and a third neural node comprises an indirect relationship, and, in response to determining the indirect relationship, determining a new node to be a bridge between the first neural node and the third neural node;

maintaining a traversal count for the individual neural nodes of the graph neural network during a training period while refining the graph neural network, the traversal count indicating a number of times each of the individual neural nodes is hit during the training period, computing respective weights for the individual neural nodes based on the traversal count, and deactivating at least one of the individual neural nodes based on the traversal count;

processing the first input data by applying a chunking function to identify one or more entities of interest to an enterprise, wherein the enterprise includes one or more line of business (LOB) relating to the particular product;

processing the identified one or more entities of interest by a plurality of neural nodes in the graph neural network, based on the respective relationships, weights, and associated impact scores, to identify a specific set of LOB(s) that are impacted by the social media message, the level of impact of each individual LOB of the specific set of LOB(s) being indicated by the associated impact scores, wherein an individual neural node from among the plurality of neural nodes performs specific functions;

refining respective rankings of the ranked enterprise strategies based on the refinement of the graph neural network;

with the one or more entities of interest as input to the neural network, corresponding to a plurality of parameters associated with the enterprise, dynamically determining output by the individual neural nodes in the plurality of neural nodes, wherein the output of one of the individual neural node is fed as input to a next connected neural node;

collating the output from the plurality of neural nodes to generate a report with action items corresponding to the specific set of LOB(s) to address the complaint of the social media message; and transmitting the report to an application to render the report to a user.

8. The method of claim 7, further comprising:
receiving the plurality of parameters strategies and tactics information of the enterprise;
performing sentiment analysis on the received strategies and tactics information to generate master data; and
feeding the generated master data to the neural network.

9. The method of claim 7, Wherein processing the identified entities of interest by a first set of neural nodes from among the plurality of neural nodes in the neural network, further comprising:
based on a first inferential function, determining whether a null hypothesis holds true between the first set of neural nodes; and
upon determining that the null hypothesis exists, inferring that a direct relationship exists between the first set of neural nodes.

10. The method of claim 9, further comprising:
upon determining that the null hypothesis does not hold true and a second inferential function is satisfied, inferring that an indirect relationship exists between the first set of neural nodes and an intermediate bridge node is activated and used to connect the first set of neural nodes.

11. The method of claim 7, further comprising:
based on inputs provided to a scoring function in a neural node, determining a score by the neural node, wherein the scoring function is a generic scoring function used by the plurality of neural nodes.

12. The method of claim 7, further comprising:
dynamic training of the neural network results in dynamic generation, re-generation and de-generation of the plurality of the neural nodes and relationship between the neural nodes, to improve accuracy of the output from the individual neural nodes.

13. The method of claim 12, wherein the generation of the neural node implies activating the neural node that is in a dormant state, and de-generation of the neural node implies moving the neural node in the active state to the dormant state.

14. A computer system for of inferential analysis and reporting of contextual data, comprising:
a computer memory to store program code; and
a processor to execute the program code to:
process a feed comprising a social media message received from one or more social media platforms to formulate first input data for a graph neural network, wherein the message is retrieved from one or more social media network, the social media message comprising a complaint relating to a particular product;
process received master data comprising second input data for the graph neural network, the second input data comprising ranked enterprise strategies obtained from a data storage device;
determine respective relationships and associated impact scores between individual neural nodes of the graph neural network, wherein a first relationship between a first neural node and a second neural node comprises a direct relationship, and a second relationship between the first neural node and a third neural node comprises an indirect relationship, and, in response to determining the indirect relationship, determining a new node to be a bridge between the first neural node and the third neural node;
maintain a traversal count for the individual neural nodes of the graph neural network during a training period while refining the graph neural network, the traversal count indicating a number of times each of the individual neural nodes is hit during the training period, computing respective weights for the individual neural nodes based on the traversal count, and deactivating at least one of the individual neural nodes based on the traversal count;
process the first input data by applying a chunking function to identify one or more entities of interest to an enterprise, wherein the enterprise includes one or more line of business (LOB) relating to the particular product;
process the identified one or more entities of interest by a plurality of neural nodes in the graph neural network, based on the respective relationships, weights, and associated impact scores, to identify a specific set of LOB(s) that are impacted by the social media message, the level of impact of each individual LOB of the specific set of LOB(s) being indicated by the associated impact scores, wherein an individual neural node from among the plurality of neural nodes performs specific functions;

refining respective rankings of the ranked enterprise strategies based on the refinement of the graph neural network;

with the one or more entities of interest as input to the neural network, corresponding to a plurality of parameters associated with the enterprise, dynamically determine output by the individual neural nodes in the plurality of neural nodes, wherein the individual neural nodes connected to one of the neural node are processed in parallel;

collate the output from the plurality of neural nodes to generate a report with action items corresponding to the specific set of LOB(s) to address the complaint of the social media message; and transmit the report to an application to render the report to a user.

15. The system of claim 14, further comprising:
receive strategies and tactics information of the enterprise;
perform sentiment analysis on the received strategies and tactics information to generate master data; and
feed the generated master data to the neural network.

16. The system of claim 14, wherein processing the identified entities of interest by a first set of neural nodes from among the plurality of neural nodes in the neural network, wherein the processor further executes the program code to:

based on a first inferential function, determine whether a null hypothesis holds true between the first set of neural nodes; and upon determining that the null hypothesis exists, infer that a direct relationship exists between the first set of neural nodes.

17. The system of claim 16, further comprising:
upon determining that the null hypothesis does not hold true and a second inferential function is satisfied, infer that an indirect relationship exists between the first set of neural nodes and an intermediate bridge node is activated and used to connect the first set of neural nodes.

18. The system of claim 14, further comprising:
based on inputs provided to a scoring function in a neural node, determine a score by the neural node, wherein the scoring function is a generic scoring function used by the plurality of neural nodes.

19. The system of claim 14, further comprising:
dynamic training of the neural network results in dynamic generation, re-generation and de-generation of the plurality of the neural nodes and relationship between the neural nodes, to improve accuracy of the output from the individual neural nodes.

20. The system of claim 19, wherein the generation of the neural node implies activating the neural node that is in a dormant state, and de-generation of the neural node implies moving the neural node in the active state to the dormant state.

* * * * *